(12) United States Patent
Osakabe

(10) Patent No.: US 8,199,382 B2
(45) Date of Patent: Jun. 12, 2012

(54) IMAGE READING DEVICES

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 439 days.

(21) Appl. No.: 12/403,359

(22) Filed: Mar. 12, 2009

(65) Prior Publication Data
US 2009/0244652 A1 Oct. 1, 2009

(30) Foreign Application Priority Data

Mar. 31, 2008 (JP) ................................ 2008-093413

(51) Int. Cl.
*H04N 1/04* (2006.01)
(52) U.S. Cl. ......... 358/497; 358/483; 358/482; 358/474
(58) Field of Classification Search .................. 358/497, 358/494, 483, 482, 474, 471, 505, 514; 250/208.1; 399/211
See application file for complete search history.

(56) References Cited

U.S. PATENT DOCUMENTS

| | | | |
|---|---|---|---|
| 5,610,731 A | 3/1997 | Itoh | |
| 5,734,483 A | 3/1998 | Itoh | |
| 6,512,602 B1 | 1/2003 | Sheng et al. | |
| 2007/0047023 A1 | 3/2007 | Oguri et al. | |

FOREIGN PATENT DOCUMENTS

| JP | H01-151873 A | 6/1989 |
|---|---|---|
| JP | H07-193689 A | 7/1995 |
| JP | H09-238216 A | 9/1997 |
| JP | H09-261424 A | 10/1997 |
| JP | H10-243181 A | 9/1998 |
| JP | 3491251 B2 | 4/1999 |
| JP | 11098322 A * | 4/1999 |
| JP | H11-098322 A | 4/1999 |
| JP | 2000-318874 A | 11/2000 |
| JP | 2001-133906 A | 5/2001 |
| JP | 2001-186308 A | 7/2001 |
| JP | 2006-115031 A | 4/2006 |
| JP | 2007-067810 A | 3/2007 |
| JP | 2007-194914 A | 8/2007 |
| JP | 2007194914 A * | 8/2007 |

OTHER PUBLICATIONS

Japan Patent Office; Notice of Reason for Rejection in Japanese Patent Application No. 2008-093413 mailed May 6, 2010.
Japan Patent Office, Notice of Reasons for Rejection for Japanese Patent Application No. 2008-093413, mailed Sep. 22, 2010.

* cited by examiner

*Primary Examiner* — Cheukfan Lee
(74) *Attorney, Agent, or Firm* — Baker Botts L.L.P.

(57) ABSTRACT

An image reading device includes a document mounting plate having a mounting surface and a rear surface, and an image reading unit. The image reading unit includes a photoelectric converter facing the rear surface, a case to hold the photoelectric converter, and at least one first rotating member and at least one second rotating member that rotate and receive a pressing force from the rear surface of the document mounting plate as the image reading unit moves. The image reading unit also includes a holder configured to support the case and at least one urging device positioned between the holder and the case. The at least one urging device urges the case toward the rear surface, and exerts an urging force opposite to the pressing force, and balances against the pressing force.

11 Claims, 9 Drawing Sheets

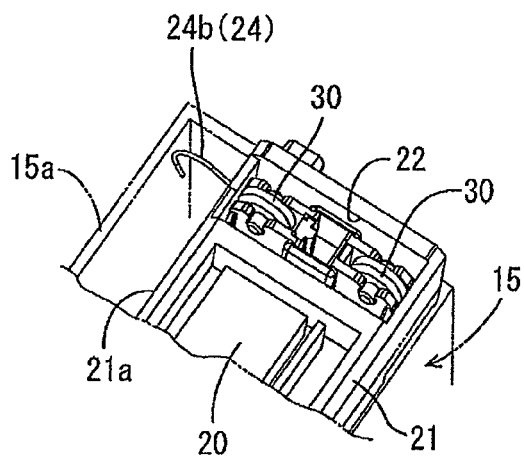
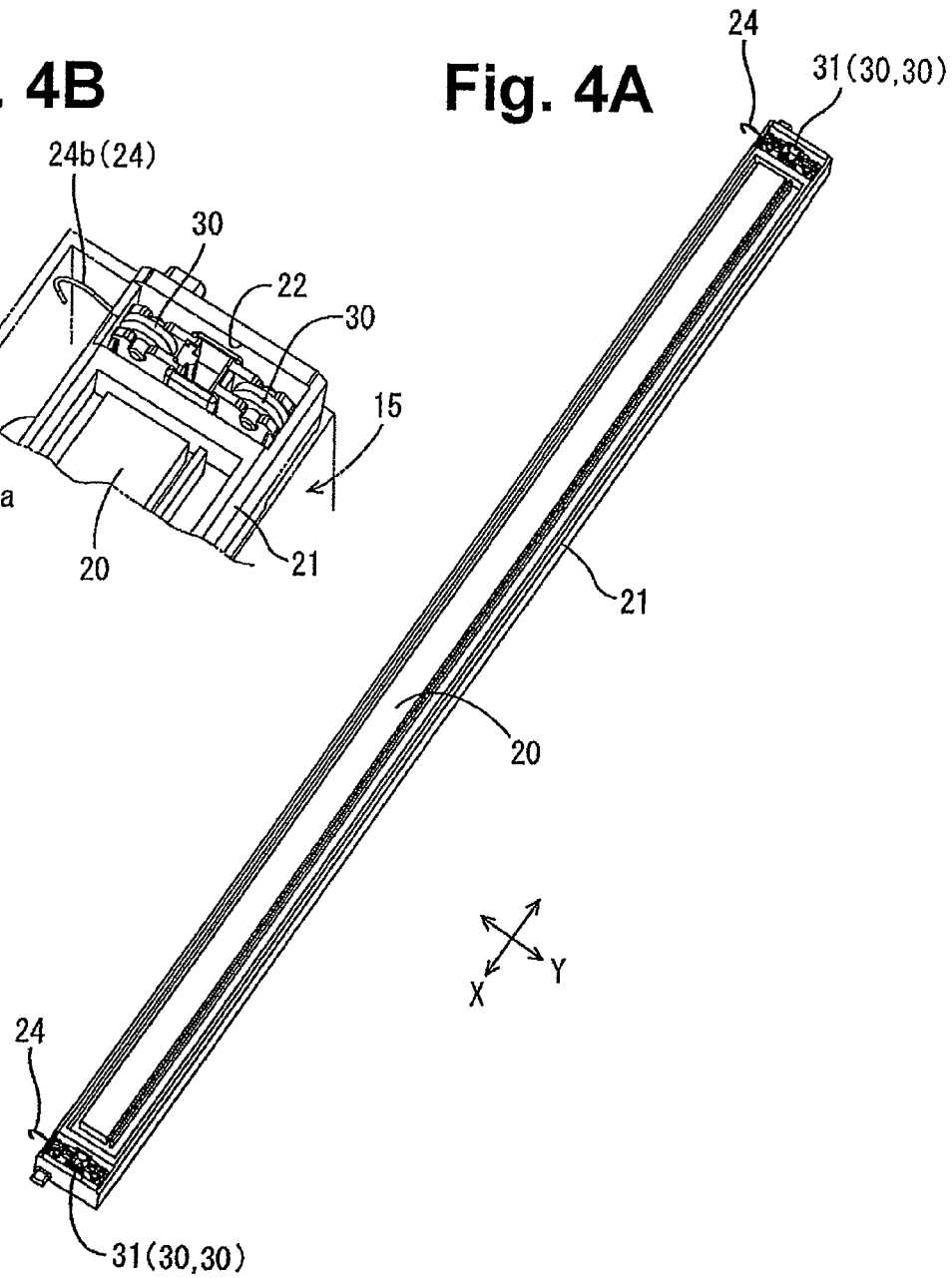

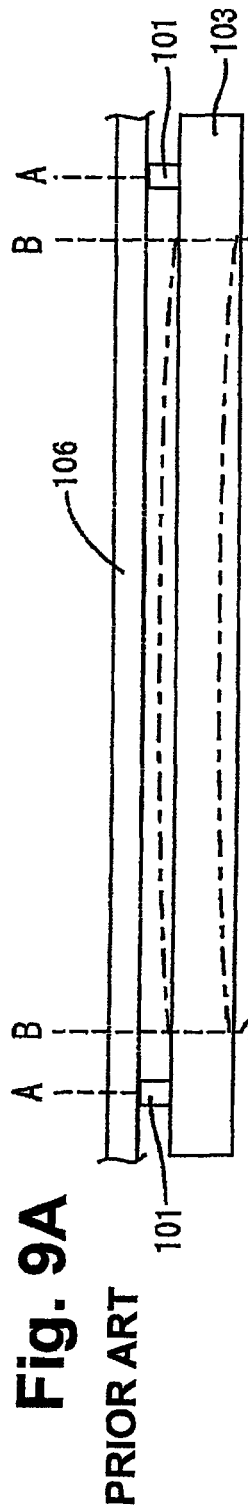
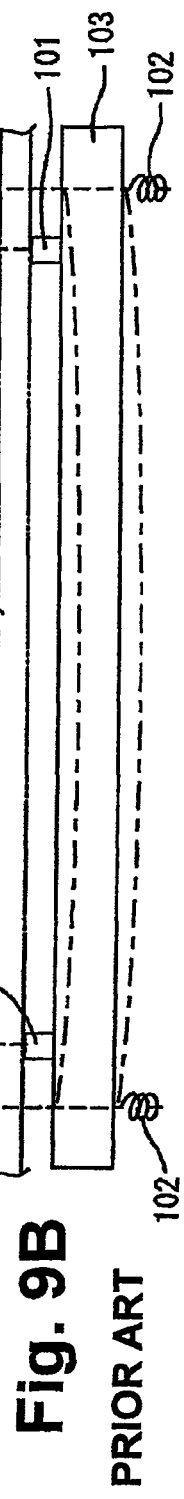
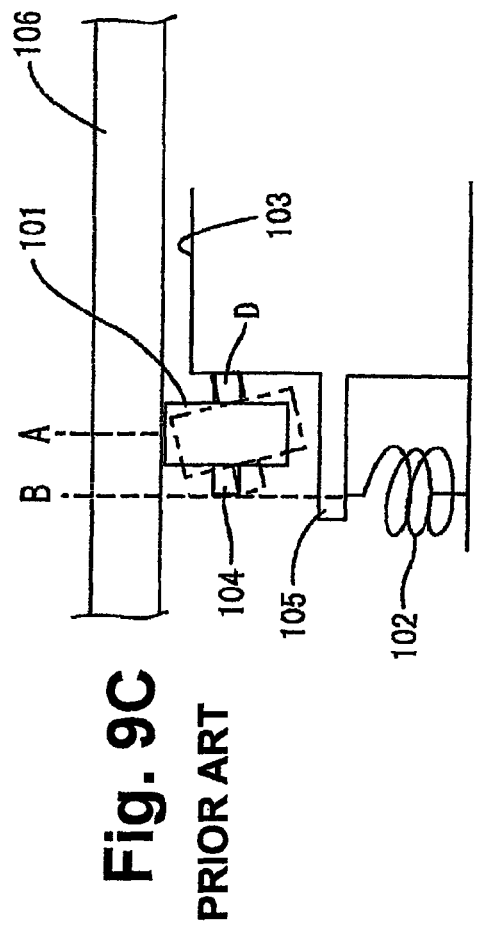
Fig. 9A PRIOR ART
Fig. 9B PRIOR ART
Fig. 9C PRIOR ART imaging # IMAGE READING DEVICES

CROSS REFERENCE TO RELATED APPLICATION

The present application claims priority from Japanese Patent Application No. 2008-093413, which was filed on Mar. 31, 2008, the disclosure of which is incorporated herein by reference in its entirety.

BACKGROUND OF THE INVENTION

1. Field of the Invention

The present invention relates to flatbed-type image reading devices configured to read an image on an original document placed on a document mounting plate.

2. Description of Related Art

A known flatbed-type image reading device reads an image on an original document with an image reading unit, e.g., an image scanner. Specifically, in the known image reading device, the image reading unit is positioned below a document mounting plate e.g., a glass, and scans a surface of the original document, which is placed on the document mounting plate with the surface facing down. The image reading unit includes a photoelectric converter configured to read an image on an original document by converting light reflected off the original document into an electrical signal. The types of the photoelectric converter include a charge coupled device ("CCD") or a contact image sensor ("CIS"). The CIS reads an image on an original document in near direct contact with the original document. Therefore, the distance between the CIS and an original document influences an image reading accuracy. The known image reading device is scanned while constantly maintaining the distance between an original document placed on the document mounting plate and the image reading unit, i.e., a lower side of the document mounting plate and the image reading unit.

A known image reading device, e.g., Japanese Laid-Open Patent Publication No. 11-98322, describes an image reading device including a photoelectric converter, e.g., a CIS, driven rotating members, e.g., rollers, and urging devices, e.g., springs. An outer peripheral surface of each driven rotating member protrudes further toward the lower surface of the document mounting plate than the photoelectric converter. The urging devices press the driven rotating members to make the outer peripheral surfaces of the driven rotating members contact the lower surface of the document mounting plate. As the outer peripheral surfaces of the driven rotating members contact the lower surface of the document mounting plate, the distance between photoelectric converter and the lower surface of the document mounting plate is constantly maintained and the image reading unit is moved smoothly by rotating the driven rotating members.

Specifically, in the known image reading device, the CIS is held in a traveling member that has a box shape with an opening end facing upward and that is elongated in a main scanning direction perpendicular to a sub-scanning direction. Rollers are supported in a cantilever manner by end walls of the CIS spaced apart in the longitudinal direction of the CIS. A flange-shaped extended portion is positioned on the end wall of the CIS so as to extend outward in the longitudinal direction of the CIS. The spring is positioned between a lower surface of the extended portion and a bottom plate of the traveling member.

Various positional relations between the rollers and the springs with respect to the CIS may be considered. Referring to a known image reading device shown in FIG. 9A, an urging position B where a spring 102 urges a CIS 103 is placed closer to a central portion of CIP 103 in a longitudinal direction thereof than a contact position A where a roller 101 contacts a lower surface of a document mounting plate 106. More specifically, contact position A is a center point of a portion of roller 101 receiving pressing force by contacting a document mounting plate 106. In the known image recording device, such a force is acted on CIS 103 to raise the central portion of CIS 103 in the longitudinal direction thereof higher than each end of CIS 103. Thus, CIS 103 is convexly deformed, as shown by dashed lines in FIG. 9A. For the purpose of clarity, the deformation is exaggeratedly shown in FIG. 9A. When CIS 103 deforms along the longitudinal direction thereof, distance between CIS 103 and an original document to be scanned varies. Variances in the distance between CIS 103 and the original document adversely affect an image reading or scanning accuracy.

Referring to a known image reading device shown in FIG. 9B, urging position B is placed closer to ends of CIP 103 in a longitudinal direction thereof than contact position A. In this case, such a force is acted on CIS 103 to raise ends of CIS 103 in the longitudinal direction thereof higher than the central potion of CIS 103. Therefore, CIS 103 is concavely deformed, as shown by dashed lines in FIG. 9B. For the purpose of clarity, the deformation is exaggeratedly shown in FIG. 9B. Similarly to the known image reading device shown in FIG. 9A, the image reading or scanning accuracy is adversely affected.

As the length of CIS 103 becomes longer, the influence of the deformation of CIS 103 becomes larger. For example, influences of deformation of CIS 103 is more remarkable when the length of CIS 103 is generally the same as the width, i.e., a shorter side, of a A3-sized original document, than when the length of CIS 103 is generally the same as the width, i.e., a shorter side, of a document with lower width, e.g., an A4-sized original document.

Referring to a known image reading device shown in FIG. 9C, contact position A and urging position B are positioned relatively close to each other. A shaft 104 of roller 101 is supported by CIS 103 in a cantilever manner. Spring 102 urges an extended portion 105 of CIS 103. Upward urging force of spring 102 is acted on a base end D of shaft 104 whereas downward pressing force is acted on roller 101 at contact position A. Therefore, roller 101 may be tilted, as indicated by dashed line in FIG. 9C, and functions of roller 101 may be impaired.

SUMMARY OF THE INVENTION

Therefore, a need has arisen for image reading devices which overcome these and other shortcomings of the related art. A technical advantage of the invention is that an image reading accuracy is improved while distance between an original document placed on a document mounting plate and an image reading unit is constantly maintained.

In an embodiment of the invention, an image reading device comprises a document mounting plate comprising a mounting surface having a first side and a second side perpendicular to the first side, and a rear surface opposite the mounting surface and configured to receive a document to be mounted, and an image reading unit having a length and a width opposite the length, wherein the length of the image reading unit extends in a direction along a first side of the mounting surface. The image reading unit comprises a photoelectric converter positioned to face the rear surface, and configured to read an image on the document, a case configured to hold the photoelectric converter, the case having a length and a width opposite the length, wherein the length of the case extends along the first side of the mounting surface, at least one first rotating member and at least one second rotating member, wherein the at least one first rotating member and the at least one second rotating member are positioned at opposite ends of the case in a longitudinal direction thereof, and the at least one first rotating member and the at least one second rotating member are configured to rotate as the image reading unit moves, and the at least one first rotating member and the at least one second rotating member are configured to receive a pressing force from the rear surface of the document mounting plate as the image reading unit moves, a holder configured to support the case, and at least one urging device positioned between the holder and the case, wherein the at least one urging device is configured to urge the case toward the rear surface, and to exert an urging force in a direction substantially opposite to the pressing force, wherein the urging force is configured to balance against the pressing force.

Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 4A is a perspective view of a case of the image reading device according to an embodiment of the invention.

FIG. 4B is a partially enlarged perspective view of the case showing its one end, according to an embodiment of the invention.

FIGS. 9A-9C are schematic drawings showing arrangements of urging members of a known image reading device.

DETAILED DESCRIPTION OF EMBODIMENTS OF THE INVENTION

Figure 1:
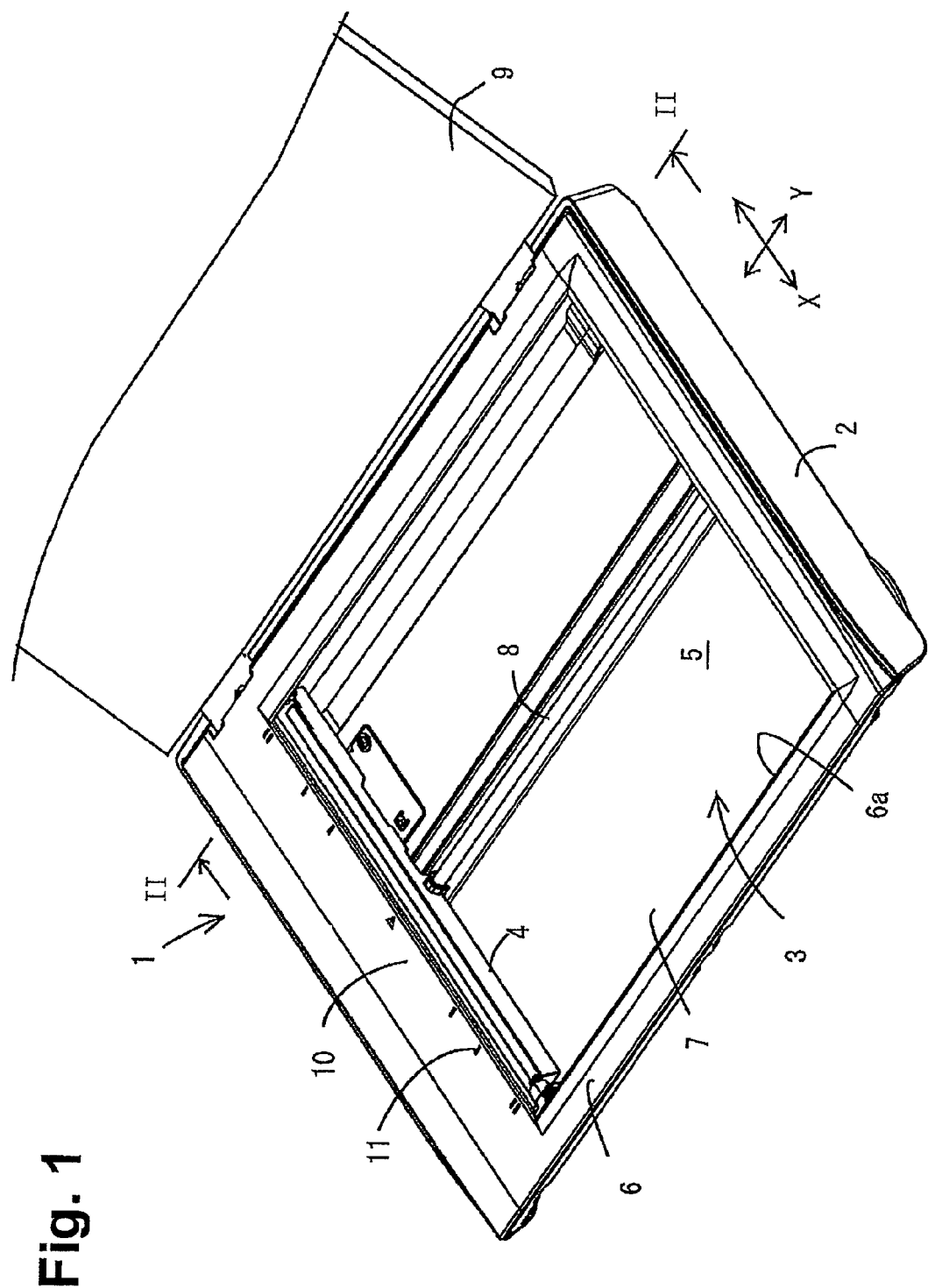
FIG. 1 is a perspective view of an image reading device in which a cover of the image reading device is open, according to an embodiment of the invention.

An embodiment of the present invention and its features and technical advantages may be understood by referring to FIGS. 1-8B, like reference numerals being used for like corresponding portions in the various drawings.

In an embodiment of the invention, an image reading device 1 may be applied to a stand-alone scanner or to an image reading section of a multi-function device configured to operate as a facsimile, a copier, a printer, or a scanner, or any combination thereof.

Referring to FIG. 1, image reading device 1 may comprise a main case 2, a document table 3 positioned above main case 2, and an image reading unit 4, e.g., an image scanning device comprising a contact image sensor (CIS). Document table 3 may be configured to place an original document thereon. Image reading unit 4 may be movably positioned below document table 3. A cover 9 sized to cover the whole area of document table 3 may be pivotally positioned on the upper portion of image reading device 1 about a rear end thereof, e.g., the right upper side as shown in FIG. 1, to open or close document table 3.

A top surface or a side surface of image reading device 1 may comprise a plurality of keys (not shown) comprising a power on/off switch to turn image reading device 1 on or off, and a start key for providing instructions to image reading device 1 to read an image on an original document. Instructions to operate image reading device 1 also may be provided thereto with the operations of keys of an external device e.g., a personal computer, connected to image reading device 1.

Figure 2:
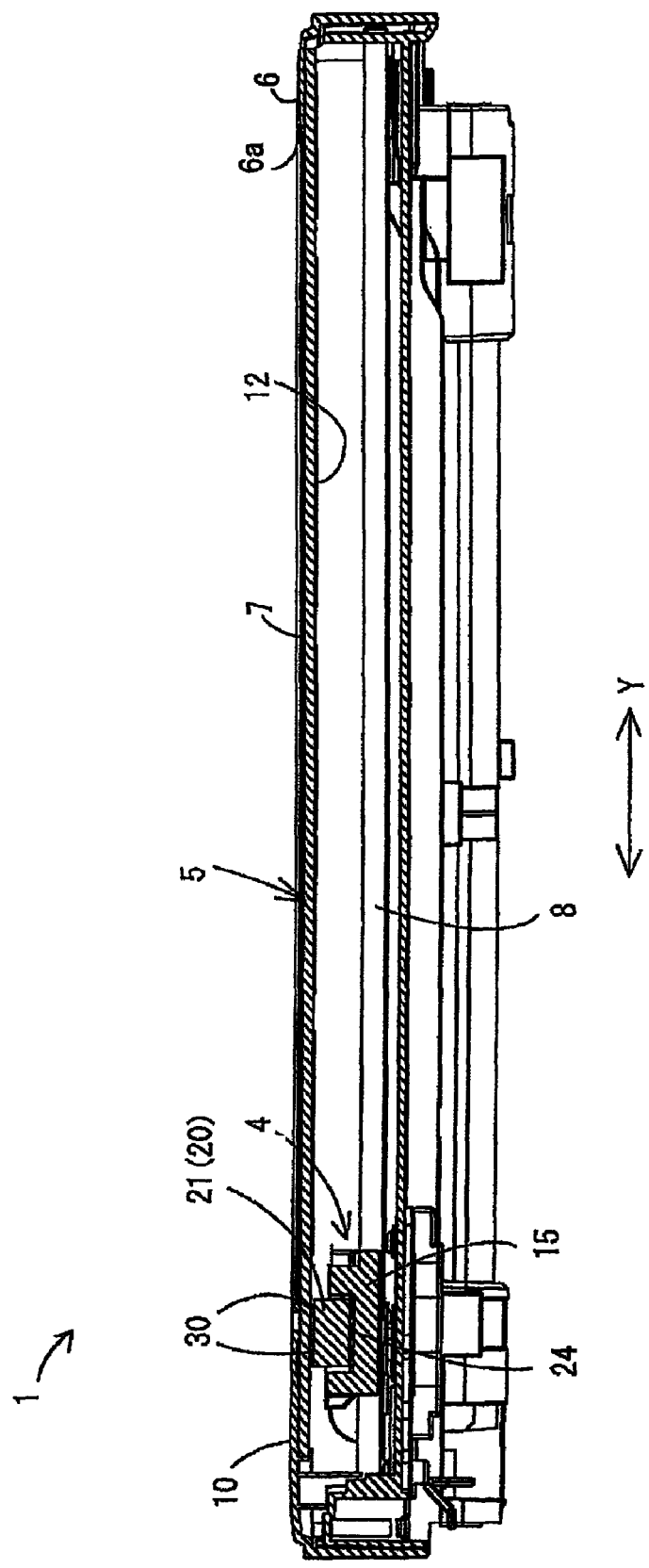
FIG. 2 is a cross-sectional view of the image reading device of FIG. 1, taken along the line II-II of FIG. 1.

Document table 3 may comprise a document mounting plate 5, e.g., a flat glass plate, and a frame 6 shaped like a thin plate. Frame 6 may be positioned such that frame 6 may substantially cover the periphery of document mounting plate 5. Frame 6 may comprise synthetic resin, and may have an opening 6a formed therethrough. A portion of document mounting plate 5 may be exposed to an exterior of frame 6 via opening 6a. An inner periphery of opening 6a and an outer periphery of frame 6 may have a substantially rectangular shape in a plan view. A portion of document mounting plate 5 that is exposed to an exterior of frame 6 via opening 6a may have a substantially rectangular shape in a plan view. The exposed portion of document mounting plate 5 may comprise a mounting surface 7 on which an original document may be mounted. A width, e.g., a first side, and length, e.g., a second side, of mounting surface 7 may be parallel to a main scanning direction X and a sub-scanning direction Y, respectively. In an embodiment, a mounting surface 7 side of document mounting plate 5 may be an upper side of document mounting plate 5 and its opposite side, e.g., a rear surface 12, e.g., as shown in FIG. 2, may be a lower side of document mounting plate 5.

One side of an inner periphery of opening 6a parallel to direction X may function as a positioning member 10, which may be used for positioning an original document to be placed on mounting surface 7. Frame 6 may be laid on document mounting plate 5, such that positioning member 10 may be positioned above mounting surface 7. Positioning member 10 may comprise reference marks 11 for placing an original document in position on mounting surface 7 according to the sizes of original documents.

Image reading unit 4, which may be positioned below document mounting plate 5, may be elongated in the main scanning direction X, such that a photoelectric converter 20, described in more detail herein, of image reading unit 4 may correspond to an image reading area in mounting surface 7 in main scanning direction X. The total length of image reading unit 4 may be set to be longer than a shorter side, e.g., the width, of mounting surface 7, in view of arrangements of driven rotating members 30, which will be described in detail below. A guide shaft 8 may be positioned below document mounting plate 5 to extend in sub-scanning direction Y from a position near a middle portion of mounting surface 7 in main scanning direction X.

Figure 3:
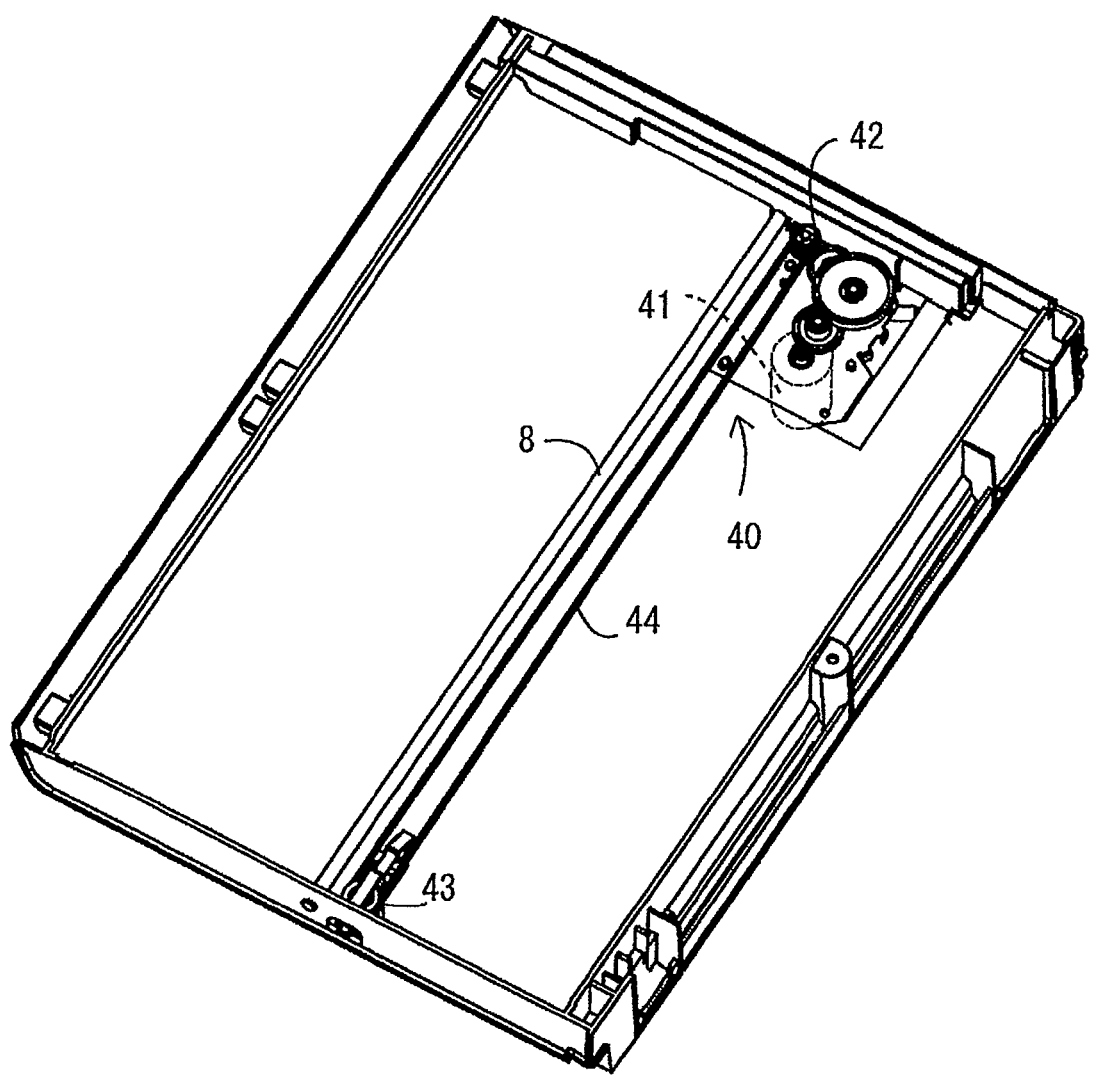
FIG. 3 is a perspective view of a drive mechanism of the image reading device according to an embodiment of the invention.

Referring to FIG. 3, a movement unit 40, e.g., a drive mechanism, comprising a motor 41, a drive pulley 42, a driven pulley 43, and a timing belt 44, may reciprocate image reading unit 4 in the sub-scanning direction Y along guide shaft 8. A portion of timing belt 44 may be held by a holding portion (not shown). Referring to FIGS. 2 and 3, a portion of timing belt 44 may be positioned on a bottom surface of a carriage 15, which may function as a holder. Image reading unit 4 may move along rear surface 12 of document mounting plate 5 opposite to mounting surface 7 to read an image on an original document. Image reading unit 4 may be configured to move to a position below positioning member 10.

Figure 5A:
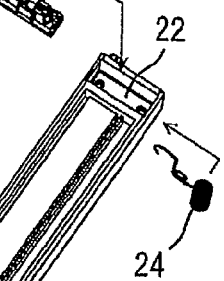
FIG. 5A is a partially exploded perspective view of the case, according to an embodiment of the invention.
Figure 5B:
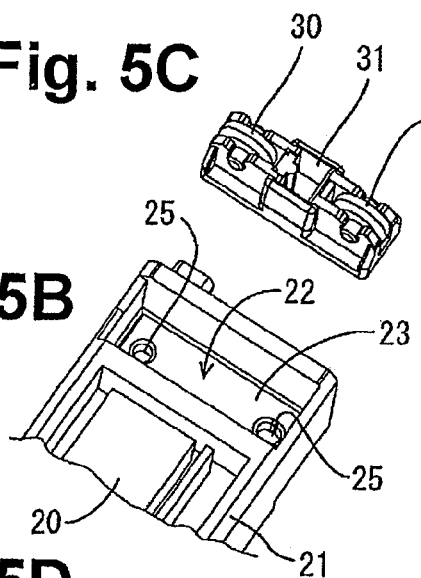
FIG. 5B is an enlarged perspective view of an accommodating portion of the case, according to an embodiment of the invention.
Figure 5C:
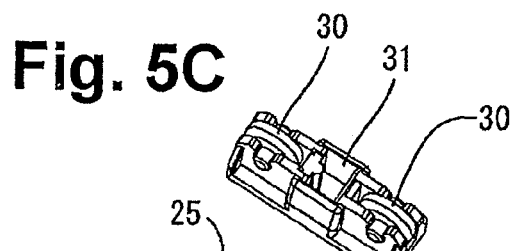
FIG. 5C is a perspective view of a supporting member, according to an embodiment of the invention.
Figure 5D:
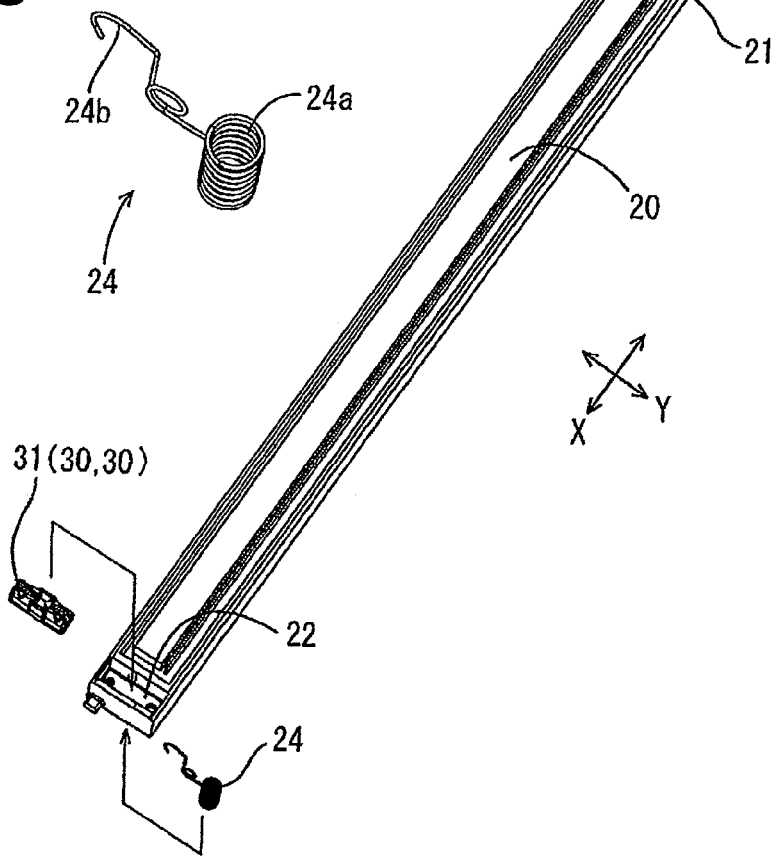
FIG. 5D is a perspective view of an urging member, according to an embodiment of the invention.

Referring to FIGS. 4A and 5D, image reading unit 4 may comprise a photoelectric converter 20 configured to perform image reading on an original document by converting an image on an original document into data. Photoelectric converter 20 may comprise a light emitting portion, e.g., a light source of LED, configured to emit light to an original document mounted on document mounting plate 5 and a light receiving portion, e.g., a C-MOS sensor, configured to receive the light reflected off the original document via a rod lens array. Structures of photoelectric converter 20 are generally known and a detailed description thereof is omitted herein. Photoelectric converter 20 may be held in a case 21 that may have a substantially box shape, with an open end facing upward. Photoelectric converter 20 also may be elongated in main scanning direction X. Case 21 may be held in carriage 15 that may have a substantially box shape with an opening end facing upward, and also may be elongated in main scanning direction X.

Figure 6A:
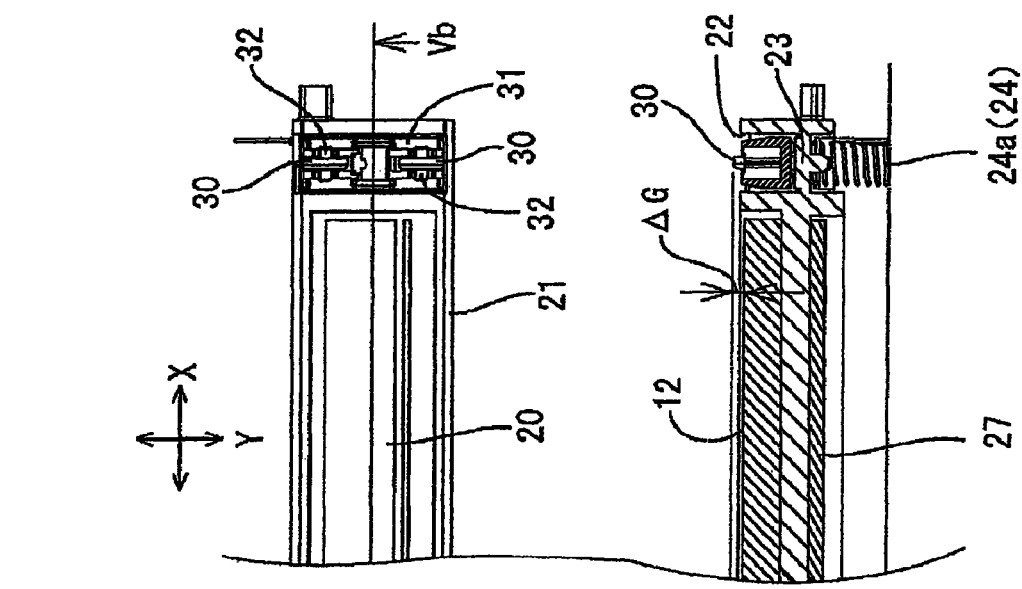
FIG. 6A is a top view of the case, according to an embodiment of the invention.
Figure 6B:
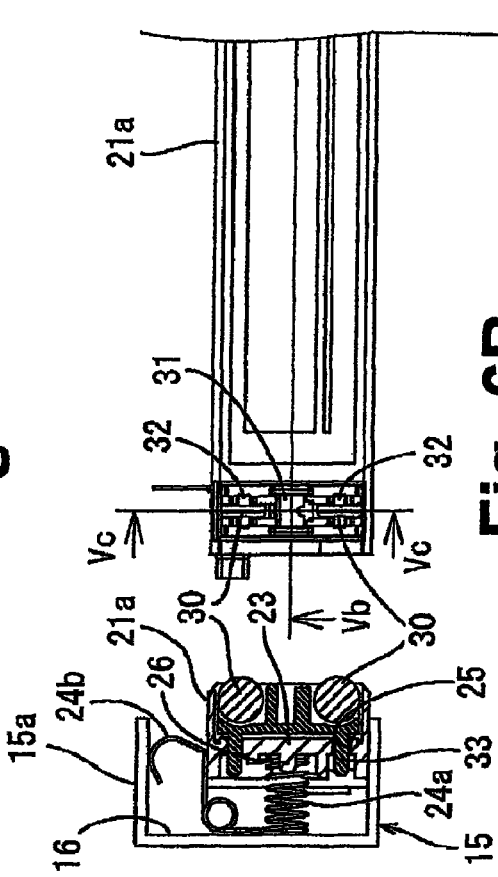
FIG. 6B is a cross-sectional view of the case, taken along the line Vb-Vb of FIG. 6A.
Figure 6C:
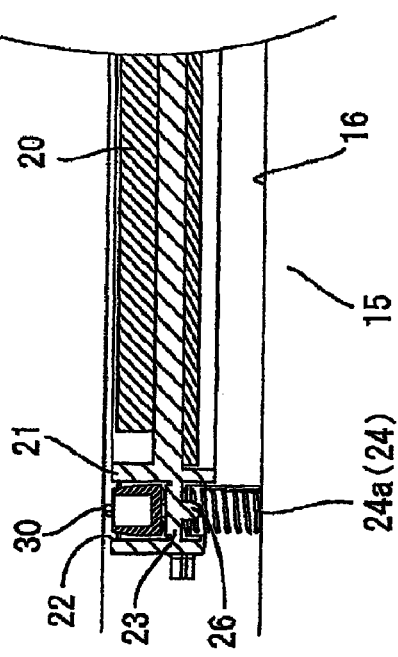
FIG. 6C is a cross-sectional view of the case, taken along the line Vc-Vc of FIG. 6A.

Photoelectric converter 20 may be held in case 21 such that photoelectric converter 20 may occupy most of the space of case 21 in its longitudinal direction, i.e., main scanning direction X. Case 21 also may comprise accommodating portions 22 configured to accommodate driven rotating members 30, which may be positioned at each end of case 21 in the longitudinal direction of case 21. Referring to FIGS. 6B and 6C, urging members 24 may be positioned between a bottom plate 23 of case 21 and a bottom plate 16 of carriage 15.

Figure 7A:
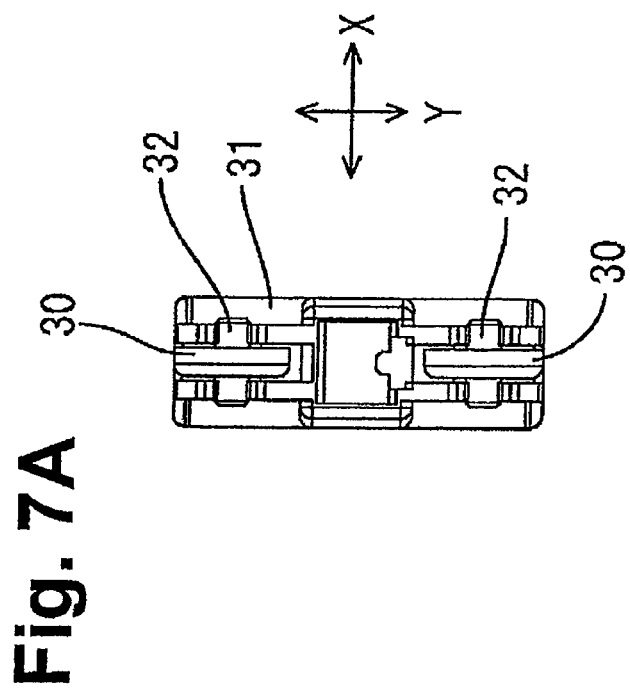
FIG. 7A is a top view of the supporting member, according to an embodiment of the invention.
Figure 7C:
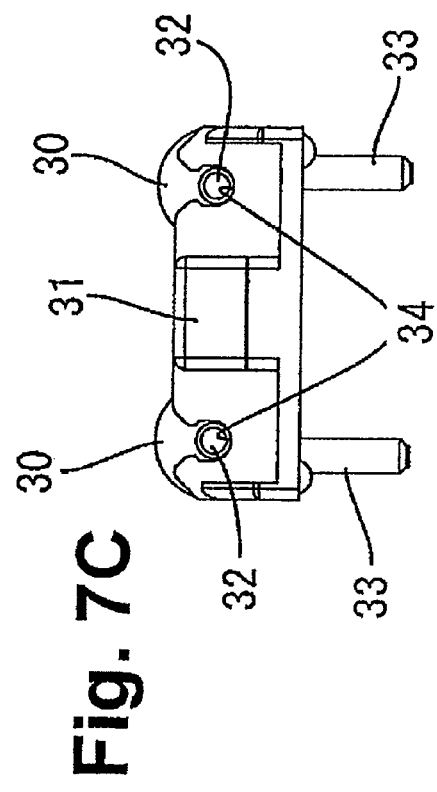
FIG. 7C is a front view of the supporting member, according to an embodiment of the invention.
Figure 7B:
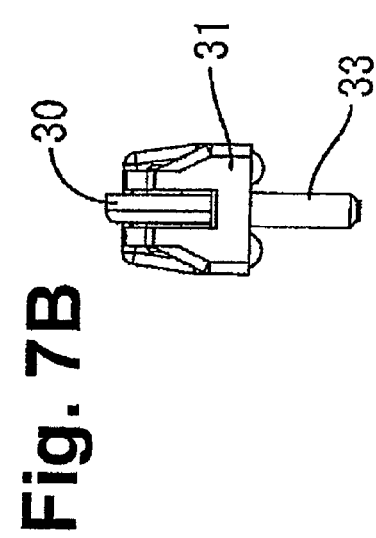
FIG. 7B is a side view of the supporting member, according to an embodiment of the invention.

Referring to FIGS. 4A-6C, two driven rotating members 30 may be accommodated in each accommodating portion 22 positioned at each end of case 21 in its longitudinal direction. Two driven members 30 may be arranged along sub-scanning direction Y with a space therebetween in accommodating portion 22. Two driven rotating members 30, which may be accommodated in each accommodating portion 22, may be rotatably supported by a supporting member 31. Each driven rotating member 30 may be configured to rotate as image reading unit 4 moves. Referring to FIG. 5C and FIGS. 7A-7C, two driven rotating members 30 and supporting member 31 may be accommodated, as a unit, in each accommodating portion 22. Each end of a shaft 32 of driven rotating member 30 may be supported by a bearing portion 34 of supporting member 31. Referring to FIG. 7C, two protrusions 33, which may extend downward, may be spaced apart in sub-scanning direction Y. Each protrusion 33 may fit into a corresponding hole 25 shown in FIG. 5B. Each hole 25 may be formed on bottom plate 23 of accommodating portion 22, such that supporting member 31 may be positioned relative to accommodating portion 22. To change the height or level of driven rotating members 30, a number of thin spacers may be positioned on bottom plate 23 of accommodating portion 22. In an embodiment of the invention, the thin spacer may comprise a thin synthetic resin film having a shape slightly smaller than a shape of bottom plate 23 of accommodating portion 22 in a plan view, and may have openings formed at positions corresponding to holes 25.

When supporting member 31 is in accommodating portion 22, each shaft 32 of two driven rotating members 30 may extend in main scanning direction X. Referring to FIG. 6B, an outer peripheral surface of driven rotating members 30 may protrude toward rear surface 12 from photoelectric converter 20 by an amount ΔG. Urging members 24 may urge case 21 toward rear surface 12, such that the outer peripheral surface of driven rotating members 30 may contact rear surface 12. Therefore, an amount ΔG may correspond to a distance between photoelectric converter 20 and rear surface 12, and may regulate the distance between photoelectric converter 20 and an original document placed on mounting surface 7. In this embodiment, photoelectric converter 20 may comprise the CIS. Therefore, amount ΔG may be set to a very small value.

Referring to FIG. 5D, urging member 24 may comprise a coil spring portion 24a and a torsion spring portion 24b connected to coil spring portion 24a. Referring to FIGS. 6B and 6C, coil spring portion 24a may be positioned between bottom plate 23 of case 21 and bottom plate 16 of carriage 15. Coil spring portion 24a may urge bottom plate 23 upward toward rear surface 12. A shaft portion 26, to which coil spring portion 24a may fit, may extend from a lower side of bottom plate 23. Shaft portion 26 may reduce a chance of coil spring portion 24a moving out of position.

Referring to FIGS. 4B and 6C, torsion spring portion 24b may be positioned between one side plate 21a of case 21 and one side plate 15a of carriage 15. Torsion spring portion 24b may urge case 21 toward a side of carriage 15 opposite to side plate 15a to reduce rattle of case 21. In an embodiment, urging member 24 may comprise torsion spring portion 24b, which may be positioned in the space between an inner side surface of carriage 15 and case 21. Nevertheless, in another embodiment, torsion spring portion 24b may be omitted, depending on specifications of carriage 15 and case 21.

Figure 8A:
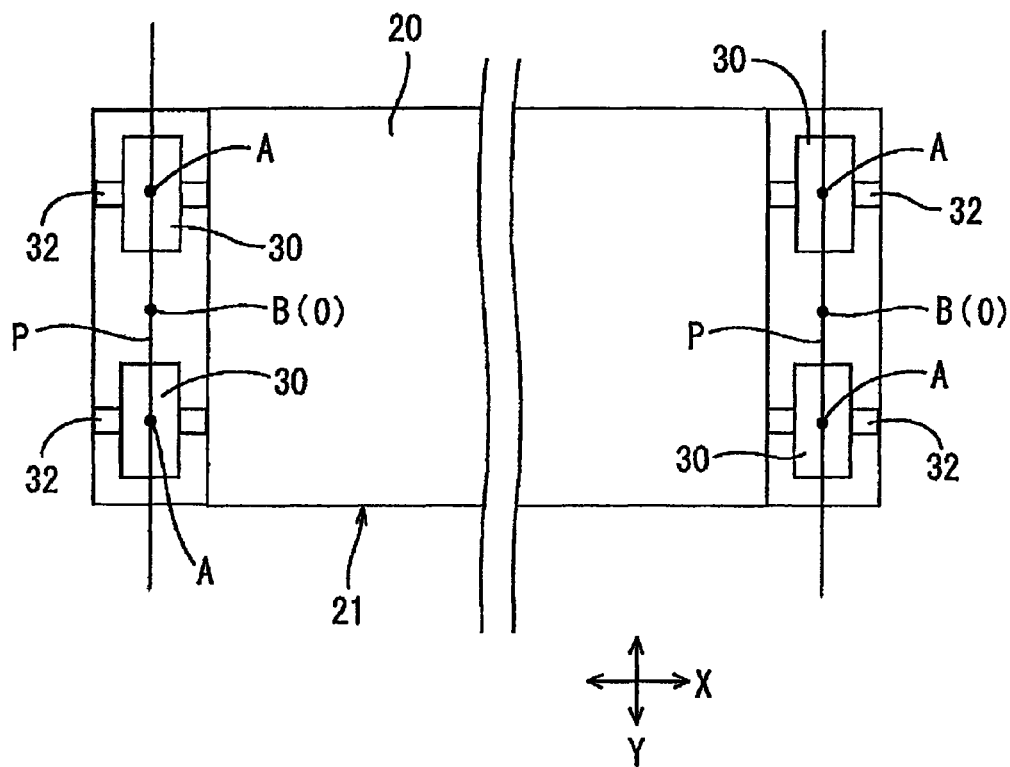
FIG. 8A is a plane view of the case showing the arrangement of the urging members, according to an embodiment of the invention.
Figure 8B:
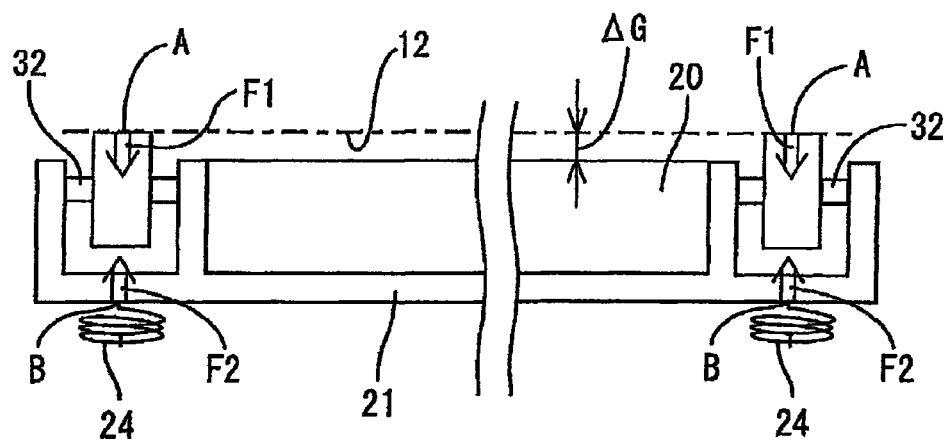
FIG. 8B is a side sectional view of the case showing the arrangement of the urging members, according to an embodiment of the invention.

Coil spring portion 24a may be positioned between two driven rotating members 30 in each accommodating portion 22, when viewed in a plan view viewed from document mounting plate 5. Referring to FIGS. 8A and 8B, a center point of a portion of drive rotating member 30 receiving pressing force by contacting rear surface 12, may be represented as a contact position A. A center of coil spring portion 24a may be represented as an urging position B. Urging position B may be positioned on a line P connecting each of contact positions A of two driven rotating members 30, respectively, in a plane view projected from document mounting plate 5. In an embodiment, one urging member 24 may be positioned in each accommodating portion 22. The center of coil spring portion 24a, e.g., urging position B, may correspond to a center O of line P connecting each of contact positions A. In other words, shaft portion 26 to which coil spring portion 24a fits may be positioned on bottom plate 23 to correspond to center O.

Referring to FIG. 6B, a circuit board 27 for photoelectric converter 20 may be positioned on case 21 at a side to opposite photoelectric converter 20 with respect to bottom plate 23, e.g., below bottom plate 23. If urging members 24 press circuit board 27, wiring on circuit board 27 may be broken or damaged. Therefore, urging members 24 may be positioned such that they may avoid contacting circuit board 27. More specifically, accommodating portion 22 may be positioned at each end of case 21 in a longitudinal direction thereof to urge a portion of bottom plate 23 of accommodating portion 22 by urging member 24.

Coil spring portion 24a may urge case 21, specifically a lower side of bottom plate 23 of accommodating portion 22, toward rear surface 12 of document mounting plate 5, such that the urging force of coil springs 24 may be conveyed to driven rotating member 30 via bottom plate 23. Thus, driven rotating members 30 may contact rear surface 12. In such a structure, pressing force may be generated between driven rotating members 30 and rear surface 12, and may be applied downwardly to case 21, via driven rotating members 30. The pressing force may be applied only to each end of case 21 elongated in main scanning direction X. As described above, the center of coil spring portion 24a, e.g., urging position B, may correspond to center O of line P connecting contact positions A.

As shown in FIG. 8B, driven rotating members 30 receive pressing force from rear surface 12, e.g., downward force F1, and urging members 24 receive urging force, e.g., upward force F2. These forces may keep a balance, e.g., equilibrium at each end of case 21 in its longitudinal direction. Thus, deformation of case 21 in the longitudinal direction thereof may be restricted or reduced even when case 21 is elongated in main scanning direction X. Consequently, variances in the magnitude of ΔG between photoelectric converter 20 and rear surface 12 along the longitudinal direction of image reading unit 4 may be restricted and accordingly, an image reading accuracy may not decrease.

Further, both ends of shaft 32 of each driven rotating member 30 may be supported by case 21. Thus, urging force of urging members 24 may be applied to entire shafts 32 and shaft 32 may not tilt or deform.

Two driven rotating members 30 may be positioned at each end of case 21 in its longitudinal direction along sub-scanning direction Y. Thus, case 21 and rear surface 12 stably may contact at four points via driven rotating members 30. When image reading unit 4 needs to be elongated in main scanning direction X to support large-sized sheets, e.g., A3-sized sheets, of original documents to be scanned in image reading device 1, deformation of image reading unit 4 in its longitudinal direction may be effectively restricted according to embodiments of the invention.

The position of urging member 24, e.g., specifically of coil spring portion 24a, may not be limited to center O between contact positions A. A plurality of urging members may be positioned on line P connecting contact positions A at positions symmetric with respect to center O. In this case, resultant of the pressing forces that driven rotating members 30 receive from rear surface 12 may be dispersed to urging members to keep balance or equilibrium. When a plurality of urging members is used, the structure of urging members may not be limited to the structure of urging member 24 according to an embodiment, but may have other structures or configurations which may perform a similar function as urging member 24.

The invention may be applied not only to flatbed-type image reading device 1 but also to a flatbed-type image reading device to which an auto-document feeder ("ADF") may be added.

Driven rotating members 30 may be rotatably supported by supporting member 31. Supporting member 31 may be accommodated in accommodating portion 22 of case 21 of image reading unit 4. In an embodiment of the invention, a bearing portion for driven rotating member 30 may be directly positioned on case 21 of image reading unit 4, and driven rotating member 30 may be directly positioned to case 21.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. An image reading device comprising:
a document mounting plate comprising a mounting surface having a first side and a second side perpendicular to the first side, and a rear surface opposite the mounting surface and configured to receive a document to be mounted; and
an image reading unit extending in a direction along the first side of the mounting surface, and the image reading unit comprising:
a photoelectric converter positioned to face the rear surface, and configured to read an image on the document;
a case configured to hold the photoelectric converter, the case extending along the first side of the mounting surface;
a first rotating member, a second rotating member, a third rotating member and a fourth rotating member, the first and second rotating members being positioned at a first end portion of the case and the third and fourth rotating members being positioned at a second end portion of the case opposite to the first end portion in a longitudinal direction thereof, and the first, second, third and fourth rotating members being configured to rotate as the image reading unit moves, and the first, second, third and fourth rotating members being configured to receive a pressing force from the rear surface of the document mounting plate as the image reading unit moves;
a holder configured to support the case; and
a first urging device and a second urging device each of which is positioned between the holder and the case, the first urging device and the second urging device being configured to urge the case toward the rear surface, the first urging device being positioned on a first line connecting the first and second rotating members as viewed from a direction perpendicular to the mounting surface, and the second urging device being positioned on a second line connecting the third and fourth rotating members as viewed from the direction perpendicular to the mounting surface,
wherein no urging device is positioned between the first line and the second line as viewed from the direction perpendicular to the mounting surface.

2. The image reading device of claim 1, further comprising a movement unit configured to move the image reading unit in a direction along the second side of the mounting surface, wherein the movement unit is positioned to face the rear surface, and wherein the holder is coupled to the movement unit and configured to move the case in the direction along the second side.

3. The image reading device of claim 1, wherein each of the first, second, third and fourth rotating members comprises a shaft that extends in the direction along the first side.

4. The image reading device of claim 1, wherein each of the first, second, third and fourth rotating members comprises a shaft, and each shaft is rotatably supported by a supporting member, and each supporting member is accommodated in a corresponding accommodating portion positioned at each end portion of the case in the longitudinal direction.

5. The image reading device of claim 4, wherein each accommodating portion comprises a bottom plate comprising a first side and a second side opposite the first side, and wherein the first, second, third and fourth rotating members are positioned at the first side of the bottom plate, and the first and second urging devices contact the second side of the bottom plate, and are configured to urge the first, second, third and fourth rotating members toward the rear surface.

6. The image reading device of claim 4, wherein the first and second urging devices are positioned in the first and second accommodating portions, respectively.

7. The image reading device of claim 1, wherein the image reading unit further comprises a first supporting member and a second supporting member, each of the first, second, third and fourth rotating members comprises a shaft, and each shaft of the first and second rotating members is supported by the first supporting member, and each shaft of the third and fourth rotating members is supported by the second supporting member.

8. The image reading device of claim 7, wherein the image reading unit further comprises a first accommodating portion and a second accommodating portion, wherein the first supporting member and the first and second rotating members are accommodated in the first accommodating portion, and the second supporting member and the third and fourth rotating members are accommodated in the second accommodating portion.

9. The image reading device of claim 1, wherein each of the first and second urging devices comprises a coil spring.

10. The image reading device of claim 1, wherein the first and second rotating members are positioned in the center of the first line as viewed from the direction perpendicular to the mounting surface.

11. The image reading device of claim 1, wherein the third and fourth rotating members are positioned in the center of the second line as viewed from the direction perpendicular to the mounting surface.

* * * * *